US012198031B2

(12) United States Patent
Ji et al.

(10) Patent No.: US 12,198,031 B2
(45) Date of Patent: Jan. 14, 2025

(54) SUBTASK ASSIGNMENT FOR AN ARTIFICIAL INTELLIGENCE TASK

(71) Applicant: Motorola Mobility LLC, Chicago, IL (US)

(72) Inventors: Zhengping Ji, Hinsdale, IL (US); Rachid M. Alameh, Crystal Lake, IL (US); Jarrett K. Simerson, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 451 days.

(21) Appl. No.: 16/846,693

(22) Filed: Apr. 13, 2020

(65) Prior Publication Data

US 2021/0319281 A1   Oct. 14, 2021

(51) Int. Cl.
| | |
|---|---|
| *G06F 9/44* | (2018.01) |
| *G06N 3/04* | (2023.01) |
| *G06N 3/08* | (2023.01) |
| *G06N 3/10* | (2006.01) |
| *H04L 67/10* | (2022.01) |

(52) U.S. Cl.
CPC ............. *G06N 3/04* (2013.01); *G06N 3/08* (2013.01); *G06N 3/10* (2013.01); *H04L 67/10* (2013.01)

(58) Field of Classification Search
CPC ...................................................... G06N 3/04
USPC ......................................................... 718/100
See application file for complete search history.

(56) References Cited

U.S. PATENT DOCUMENTS

| | | | | |
|---|---|---|---|---|
| 9,378,063 | B2 * | 6/2016 | Canoy | G06F 9/5044 |
| 9,563,854 | B2 * | 2/2017 | Cruz Mota | G06N 20/00 |
| 9,633,315 | B2 * | 4/2017 | Chapelle | G06N 20/00 |
| 10,158,653 | B1 * | 12/2018 | Magcale | H04L 63/1441 |
| 10,417,055 | B2 * | 9/2019 | Ananthapur Bache | G06F 9/5066 |
| 10,540,616 | B2 * | 1/2020 | Elenbaas | G06Q 10/06 |
| 10,901,801 | B2 * | 1/2021 | Lovelace | G06F 11/3409 |
| 11,205,143 | B2 * | 12/2021 | Guastella | G06Q 10/063112 |
| 2019/0244103 | A1 * | 8/2019 | Wang | G06N 3/088 |
| 2020/0401829 | A1 * | 12/2020 | Xin | G06V 10/82 |
| 2021/0055959 | A1 * | 2/2021 | Rehman | G06F 9/4881 |
| 2021/0064936 | A1 * | 3/2021 | Itu | G06K 9/6263 |
| 2021/0195285 | A1 * | 6/2021 | Lee | H04N 21/23103 |
| 2023/0351586 | A1 * | 11/2023 | Brynolfsson | G06T 7/11 |

FOREIGN PATENT DOCUMENTS

| | | | | | |
|---|---|---|---|---|---|
| CN | 111240848 A | * | 6/2020 | | G06F 9/4881 |
| FI | 121618 B | * | 2/2006 | | |

(Continued)

OTHER PUBLICATIONS

Anil, "Large Scale Distributed Neural Network Training Through Online Distillation", Apr. 9, 2018, 12 pages.

(Continued)

*Primary Examiner* — Evral E Bodden
(74) *Attorney, Agent, or Firm* — FIG. 1 Patents

(57) ABSTRACT

Techniques for subtask assignment for an artificial intelligence (AI) task are described, and may be implemented to leverage a local set of devices to distribute portions of an AI task between the devices. Generally, the described techniques enable AI task allocation based on a variety of factors, such as device capabilities, device availability, task complexity, and so forth.

20 Claims, 7 Drawing Sheets

(56) References Cited

FOREIGN PATENT DOCUMENTS

JP           10320146 A * 12/1998
WO    WO-2019180700 A1 * 9/2019 ............ B60W 30/16

OTHER PUBLICATIONS

Dean, "Large Scale Distributed Deep Networks", In Proceedings of 26th Annual Conference on Neural Information Processing Systems, Dec. 3, 2012, 11 pages.
Feunteun, "Parallel and Distributed Deep Learning: A Survey", Apr. 29, 2019, 10 pages.
Gupta, "Distributed learning of deep neural network over multiple agents", Oct. 14, 2018, 21 pages.

* cited by examiner

SUBTASK ASSIGNMENT FOR AN ARTIFICIAL INTELLIGENCE TASK

BACKGROUND

Artificial intelligence (AI) is increasingly utilized to perform a variety of different computational tasks, such as image recognition, speech recognition, natural language processing, content generation, etc. In some example implementations, AI tasks are performed using an artificial neural network, which represents a type of AI architecture that is implemented via layers that each perform different respective portions of an overall task. For instance, some neural networks include an input layer that encodes a set of data to be processed, intermediate (e.g., hidden) layers that perform intermediate processing on the encoded input data, and an output layer that decodes the processed data to provide decoded data. Generally, the decoded data represents a "real world" result of processing input data, such as a predicted label for an input image, a predicted portion of text based on audio input, a new portion of text generated based on a language model (e.g., by a generative neural network), and so on.

While AI provides ways for automating performance of a multitude of different complex tasks, conventional AI techniques exhibit a number of implementation challenges. For instance, due to their complexity, AI algorithms are typically executed using cloud-based (e.g., network-based) systems that receive data for processing according to a requested task, process the data, and return processed data to a requesting entity (e.g., an edge device) over a network connection. While cloud processing benefits from attributes such as high computational and processing powers, processing speed, and the huge data bases available for neural network processing, cloud processing may suffer from excess data latency introduced by bidirectional transmission of data between an entity providing input data (e.g., an end user) and a cloud-based AI system that processes the data and returns resulting data. Further, cloud-based AI systems that utilize external network connections (e.g., the Internet) for data communication introduce risks that unauthorized parties may intercept and expose the data. For this reason, end users are in general concerned, due to fear of privacy risks, when sensitive data leaves their devices. Thus, due to their system configurations, conventional AI systems may experience both performance and security challenges.

BRIEF DESCRIPTION OF THE DRAWINGS

Aspects of subtask assignment for an AI task are described with reference to the following Figures. The same numbers may be used throughout to reference similar features and components that are shown in the Figures.

DETAILED DESCRIPTION

Figure 1:
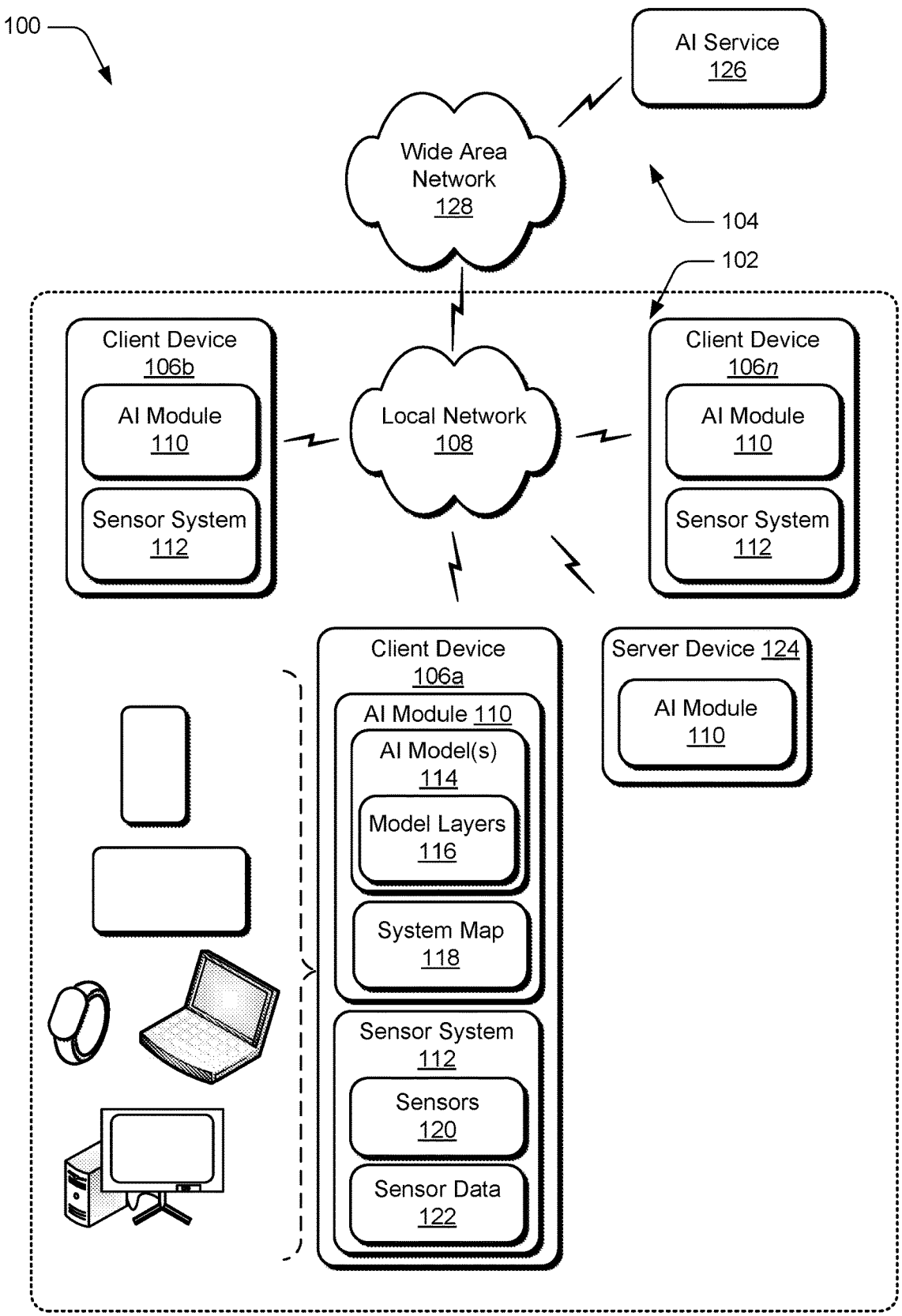
FIG. 1 illustrates an example environment in which aspects of subtask assignment for an AI task can be implemented.

Techniques for subtask assignment for an artificial intelligence (AI) task are described, and may be implemented to leverage a local set of devices to distribute portions of an AI task between the devices. Generally, the described techniques enable AI task allocation based on a variety of factors, such as device capabilities, device availability, task complexity, and so forth.

For instance, consider a scenario where a number of client devices are connected within a local computing environment, such as a local area network (LAN). An AI module executing within the local computing environment (e.g., on one of the client devices) determines that a computation task is to be performed utilizing artificial intelligence. Examples of different computation tasks are discussed below, and include tasks such as visual object recognition, speech recognition, content generation, model training, and so forth. Accordingly, the AI module identifies different client devices in the local computing environment that are available to participate in performing the computation task, and assigns subtasks of the computation task to the different client devices, such as edge devices under the possession and direct control of the user. The computation task, for instance, is divided into multiple subtasks that are each executable to perform a portion of the overall computation task. In at least one implementation, the computation task is to be performed using a layered AI model (e.g., an artificial neural network), and thus execution of different layers of the AI model are assigned to different respective client devices.

Generally, assignment of different subtasks of a computation task to different client devices can be based on a number of different criteria. For instance, different subtasks may each have different subtask criteria, such as estimated computation resources to be utilized by the subtask, potential security risks surrounding the subtask, execution time constraints for the subtask, and so forth. Further, individual client devices may have differing attributes, such as different processor and/or memory bandwidth, different network bandwidth capabilities, different security levels, etc. Thus, assigning subtasks may include correlating subtask criteria to client devices with attributes that are most likely to comply with the subtask criteria. For instance, where a particular subtask is estimated as requiring a substantial processing and/or memory requirement, the subtask is assigned to a client device that is identified as likely having sufficient processing and/or memory resources to perform the task within a given time constraint.

Accordingly, different subtasks can be assigned to different client devices, which can each execute their respective subtasks to generate a task result for a computation task. In at least one implementation, subtasks can be cooperatively executed among a set of client devices, and results of subtasks can be shared among the client devices to enable the subtask results to be utilized for performing other respective subtasks. For instance, a first client device may take input data for processing and execute an encoding subtask to encode the data to generate encoded data. The first client device can then communicate the encoded data to a second client device, which can utilize the encoded data for a further subtask to generate encoded processed data. Generally, this process can continue until a task result for the computation task is achieved, such as by a further client device that performs a decoding subtask to generate a decoded task result.

The described techniques may be employed to arrange and assign subtasks of a computation task according to a variety of different subtask pipeline architectures. For instance, subtasks of a computation task can be assigned to a single pipeline of client devices, such as to perform subtasks in a serial manner. Alternatively or in addition, multiple subtask pipelines can be defined to perform different subtasks in parallel to generate different task results for the different subtask pipelines. A first subtask path and a second subtask path, for example, can be defined for a computation task utilizing different sets of subtasks and/or client devices to generate different task results. The first subtask path may be defined based on estimating that the first subtask path can execute subtasks and achieve a task result more quickly than the second subtask path. Further, the second subtask path may be estimated to have a longer execution time than the first subtask path, but to produce a task result that achieves a more accurate result than the first subtask path. Thus, the first subtask path and the second subtask path can be executed to generate respective task results. The first subtask path, for instance, may output a task result more quickly than the second subtask path, such as to provide a preliminary task result for a computation task. The second subtask path may subsequently output a task result, such as a task result that achieves higher accuracy (e.g., higher resolution) than the task result from the first subtask path. In at least one implementation, the task results from the first subtask path and the second subtask path can be merged into a single merged task result, such as by combining the respective task results.

In at least some implementations, assigning all the neural network subtasks of a computation task to a single device may not be feasible due to limited processing speeds, memory, power, and deep data analysis involved. Thus, multiple local client devices (e.g., edge devices) may be leveraged to perform some of the subtasks, such as those subtasks that involved sensitive information such as authentication, personalization, contextual subtasks, etc. Other subtasks may be delegated to a cloud service, such as those subtasks that may not involve the risk of exposing sensitive information. Further, situations for deep network computations may arise while access to a cloud AI system may not be available, and thus splitting subtasks of a computation task between user owned edge devices becomes beneficial to account for such unavailability of cloud services.

Accordingly, techniques described herein provide flexible ways for executing subtasks of an AI computation task in a local environment. Further, the described techniques provide for enhanced data security by limiting potential exposure of data related to a computation task. For instance, by utilizing client devices in a local computing environment (e.g., a LAN), potential data exposure outside of the local environment is limited. Further, since subtasks are allocated among different client devices, intercepting subtask data from a single client device will likely not expose relevant data in the clear. For example, individual client devices executing subtasks will typically utilize portions of encoded data that by themselves do not reveal sensitive data in the clear, thus limiting the ability of unauthorized entities gaining access to sensitive data. In at least some implementations, the described techniques enhance device and system performance by allocating subtasks to devices based on device capabilities, thus avoiding overburdening computing resources of individual devices with complex computing tasks.

While features and concepts of subtask assignment for an AI task can be implemented in any number of different devices, systems, environments, and/or configurations, aspects of subtask assignment for an AI task are described in the context of the following example devices, systems, and methods.

FIG. 1 illustrates an example environment 100 in which aspects of subtask assignment for an AI task can be implemented. The example environment 100 includes a local environment 102 and a remote environment 104. The local environment 102 represents an environment (e.g., a physical and/or logical environment) defined by a limited area such as a physical and/or logical perimeter of a residence, enterprise facility, school, university campus, and so forth. The remote environment 104 represents an environment (e.g., a physical and/or logical environment) external to the local environment 102, or a larger environment that encompasses the local environment 102 as well as other physical and/or logical regions, e.g., some or all of planet Earth.

The local environment 102 includes a number of client devices 106, including a client device 106a, a client device 106b, and a client device 106n interconnected via a local network 108. Generally, the client devices 106 can each be implemented as a variety of different types and instances of computing devices, such as portable computing devices (e.g., a smartphone, a tablet device, a laptop, a wearable computing device, a smart TV, etc.), a desktop device (e.g., a desktop PC), connected home appliances such as Internet of Things (IoT) devices, and so forth. These examples are not to be construed as limiting, however, and the client devices 106 can be implemented in a variety of different ways and form factors. Further example attributes of the client devices 106 are discussed below with reference to the device 700 of FIG. 7.

The local network 108 represents a network (e.g., a Local Area Network (LAN)) that interconnects devices within a limited area associated with the local environment 102. The client devices 106, for instance, connect to the local network 108 via wireless and/or wireless connectivity. Generally, the local network 108 can be implemented using different network protocols and/or topologies. For instance, the local network 108 can be implemented via a connectivity device such as a router that is separate from the client devices 106 and that interconnects the client devices 106. Alternatively or in addition, the local network 108 can be implemented via direct connectivity between the client devices 106, such as part of an ad hoc wireless network and/or mesh network. In at least some implementations, the client devices to share in executing subtasks of a computation task are to be paired and in proximity to an owner/user, such as located in the user's home, co-located with the user in a portable setting (e.g., while traveling), etc.

In at least some implementations, the local network 108 represents a local authentication environment positioned within the local environment 102. For instance, each of the client devices 106 engage in an authentication procedure to authenticate with the local network 108 to permit data to be exchanged between the client devices 106 over the local network 108. Thus, other devices that are present within the local environment 102 but that are not authenticated with the local network 108 may have limited or no visibility into data communicated across the local network 108 between the client devices 106.

The client device 106a is depicted as an example implementation of the client devices 106, and includes various functionality that enables the client device 106a to perform different aspects of subtask assignment for an AI task discussed herein, including an artificial intelligence (AI) module 110 and a sensor system 112. Generally, the AI module 110 is representative of functionality to perform different AI tasks. For instance, the AI module 110 implements an artificial intelligence (AI) model 114 (and/set of AI models 114) that represents an algorithm architecture that can be leveraged to process data in various ways further to different AI tasks. While the AI model 114 is discussed herein as representing an artificial neural network, the AI model 114 may additionally or alternatively be implemented using any suitable AI architecture, such as decision trees, support vector machines, linear regression, logistic regression, Bayesian networks, and so forth.

The AI model 114 includes model layers 116, which represent subdivisions of the AI model 114 that can be individually distributed for performing different portions of an AI task. In a neural network implementation, for example, the model layers 116 may include input layers (e.g., encoding layers), intermediate layers (e.g., hidden layers), output layers (e.g., decoding layers), and so forth. In an example utilization of the AI model 114, individual instances of the model layers 116 may each be leveraged to perform different portions (e.g., subtasks) of an AI task. Further, different instances of the model layers 116 may be activated on different respective instances of the client devices 106 based on different subtask distribution criteria detailed herein. Generally, the AI model 114 can be trained using training data to perform a variety of different computation tasks, examples of which are presented below.

The AI module 110 further includes a system map 118, which represents a mapping of different devices in the local environment 102, such as devices that are currently and/or historically connected to the local network 108. The system map 118, for instance, identifies each of the individual client devices 106 and attributes of the client devices 106. For example, for each client device 106, the system map 118 can include device attributes such as device identifier, device type (e.g., mobile phone, desktop, tablet, etc.), device hardware (e.g., processor type, display type, available sensors, etc.), device capabilities (e.g., processor bandwidth, memory bandwidth, data storage capabilities, sensor capabilities, etc.), device power state (e.g., plugged-in state, battery charge level, etc.), network speed (e.g., wireless and/or wired network connectivity bandwidth), and so forth. In at least some implementations, the system map 118 is dynamically and/or continuously updated to keep a real-time representation of devices that are active and/or inactive in the local environment 102.

The sensor system 112 is representative of functionality to detect various physical and/or logical phenomena in relation to the client device 106a, such as motion, light, image detection and recognition, time and date, position, location, touch detection, temperature, and so forth. To enable the sensor system 112 to detect such phenomena, the sensor system 112 includes sensors 120 that are configured to generate sensor data 122. Examples of the sensors 120 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, the sensor data 122 represents raw sensor data collected by the sensors 120. Alternatively or in addition, the sensor data 122 represents raw sensor data from the sensors 120 that is processed to generate processed sensor data, such as sensor data from multiple sensors 120 that is combined to provide more complex representations of client device 106 state than can be provided by a single sensor 120.

As mentioned previously, the client device 106a is representative of a general implementation of the different client devices 106. In this particular example, for instance, the client devices 106a-106n each include an AI module 110 and a sensor system 112. The AI modules 110 implemented on the client devices 106b, 106n each represent instances and/or variations of the AI module 110 implemented on the client device 106a. For instance, the AI modules 110 implemented on the client devices 106b, 106n may include duplicate or different functionality to the AI module 110 implemented on the client device 106a. Further, the sensor systems 112 implemented on the client devices 106b, 106n may include duplicate or different functionality (e.g., sensors 120) to the sensor system 112 implemented on the client device 106a.

The local environment 102 further includes a server device 124, which is representative of a device that may be implemented to manage and/or perform various aspects of subtask assignment for an AI task described herein. As illustrated, the server device 124 includes an implementation of the AI module 110, which the server device 124 may utilize to participate in different AI tasks implemented in the local environment 102. The server device 124, for instance, can serve as an AI task broker that identifies different subtasks of an overall AI task, and assigns the individual subtasks to different client devices 106. In at least some implementations, the server device 124 is optional, and management of AI tasks may be performed by a client device 106 and/or among the client devices 106. Thus, implementations for subtask assignment for an AI task support centralized management of AI tasks (e.g., by the server device 124 and/or an instance of a client device 106), and/or distributed management of AI tasks, such as among multiple instances of the client devices 106 and/or between the client devices 106 and the server device 124.

The remote environment 104 includes an AI service 126 which is accessible via a wide area network (WAN) 128. The AI service 126, for instance, represents a remote service (e.g., a cloud-based service) that is accessible by one or more of the client devices 106 and that can perform different AI-related tasks. In at least one example, the AI service 126 can perform a subtask of an AI task that involves the client devices 106, such as a subtask that is delegated from within the local environment 102 to the AI service 126. Generally, connectivity from the local environment 102 to the AI service 126 can be performed in different ways, such as via connectivity between the local network 108 and the WAN 128, and/or via connectivity between the client devices 106 and the WAN 128.

Having discussed an example environment via which aspects of subtask assignment for an AI task may be implemented, consider now some example implementation scenarios for implementing aspects of subtask assignment for an AI task.

Figure 2:
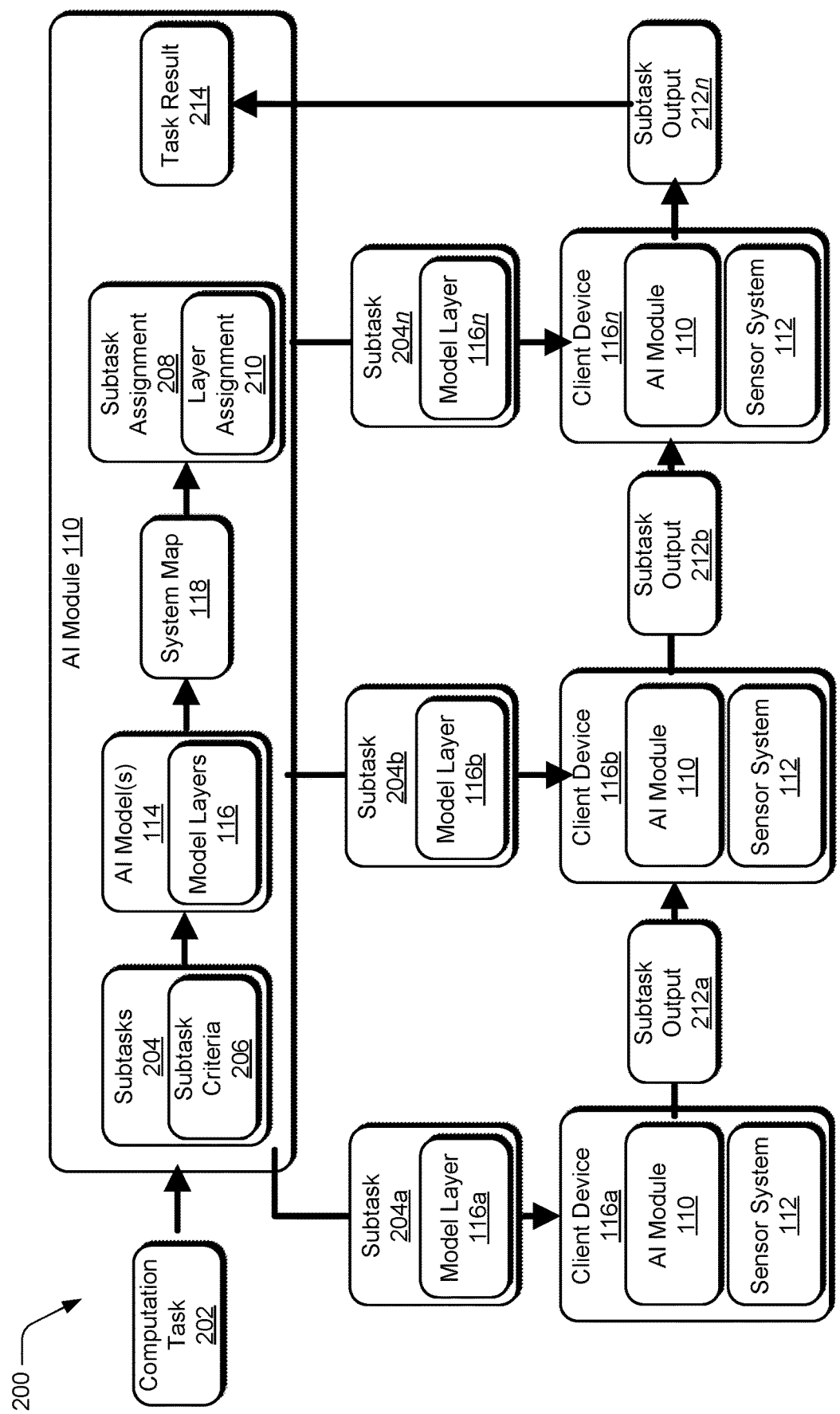
FIG. 2 depicts a scenario for performing a computing task according to techniques for subtask assignment for an AI task in accordance with one or more implementations.

FIG. 2 depicts an example scenario 200 for performing a computing task according to techniques for subtask assignment for an AI task. In the scenario 200, an instance of the AI module 110 receives a computation task 202. A user, for instance, inputs a request to perform the computation task 202. Generally, the computation task 202 represents a particular task and/or set of tasks to be performed leveraging the AI module 110, such as image recognition, speech recognition, natural language processing, and so forth. In an image recognition scenario, for example, the computation task 202 can include digital content and a request to recognize (e.g., classify) visual objects in the digital content. In a speech recognition scenario, the computation task 202 can include audio content and a request to recognize words in the speech content, such as to generate a text transcript from the audio content. In a natural language processing scenario, the computation task 202 can include a request to generate portions of text content that conform to a particular set of language rules, such as a particular language grammar. These computation tasks are presented for purpose of example only, and it is to be appreciated that techniques for subtask assignment for an AI task can be employed to perform a variety of different computation tasks not expressly described herein.

Accordingly, the AI module 110 processes the computation task 202 to parse the computation task 202 into different subtasks 204. The subtasks 204, for instance, represent different divisions of the computation task 202 that contribute to obtaining an output for the computation task 202. For instance, in an image recognition scenario, the subtasks 204 can include feature extraction, feature matching, feature classification, and so forth. In a speech recognition scenario, the subtasks 204 can include audio feature extraction, audio spectral analysis, audio feature recognition, and so forth.

In at least some implementations, the subtasks 204 represents individual computational steps that are to be performed using the AI model 114, such as by individual model layers 116. For instance, each individual subtask 204 represents a task to be performed by a different respective model layer 116 and/or subset of model layers 116 to achieve a result for the computation task 202. Further, each subtask 204 includes respective subtask criteria 206 that represent parameters for executing the subtask 204. In at least one implementation, the subtask criteria 206 include resource usage estimations for a respective subtask 204, such as an estimated processor usage, estimated memory usage, estimated network bandwidth usage, and so forth, for performing the subtask.

Alternatively or in addition, the subtask criteria 206 can include hardware specifications for a respective subtask 204, such as preferred hardware capabilities for a device performing the subtask. In at least one implementation, the hardware specification can be based on available sensors 120, such as for capturing various state conditions as part of a respective subtask 204. For instance, consider a scenario where the computation task 202 involves image capture and motion data. Thus, subtask criteria 206 for a particular subtask 204 that involves capturing image data and/or motion data can specify a preference for image capture hardware and motion capture hardware.

The subtask criteria 206 may alternatively or in addition specify security (e.g., privacy) preferences and/or constraints for respective subtasks 204. For instance, if a particular subtask 204 is particularly privacy sensitive, a subtask criteria 206 can specify that the subtask is a high security task. In at least one implementation, multiple different security levels can be defined such that subtask criteria 206 specify a particular security level for a respective subtask, such as low security, medium security, high security, and so forth.

The subtask criteria 206 may alternatively or additionally specify time constraints on execution of respective subtasks. For instance, subtask criteria 206 for a particular subtask 204 may indicate a maximum allowed and/or preferred execution time for the subtask, such as x milliseconds. Thus, a client device 106 that is estimated to have sufficient computing resources to achieve this execution time parameter can be assigned the subtask.

Further to the scenario 200, the AI module 110 leverages the system map 118 to perform subtask assignment 208 for the subtasks 204. As mentioned above, the system map 118 includes a mapping of devices that are available to perform different computing tasks, such as devices that are active in the local environment 102 and/or connected to the local network 108. Further, the system map 118 can identify attributes of individual devices, such as hardware and/or software capabilities of individual devices.

Accordingly, based on the system map 118, the AI module 110 performs subtask assignment 208 to assign different subtasks 204 to different client devices 106. For instance, for each subtask 204, the AI module 110 can identify a particular client device 106 that is available (e.g., running and connected to the local network 108) and that complies with respective subtask criteria 206. For example, if subtask criteria 206 for a particular subtask 204 indicates that the subtask 204 involves high resource utilization (e.g., high processor bandwidth, memory bandwidth, network bandwidth, and so forth), the AI module 110 can identify an available device in the system map 118 that is identified as having resource attributes capable of providing the resource utilization for the subtask.

Alternatively or in addition, if subtask criteria 206 for a particular subtask 204 identify hardware specifications for the particular subtask, the AI module 110 can identify an available device in the system map 118 that is indicated as having hardware that corresponds, at least in part, to the hardware specified in the subtask criteria 206. Alternatively or in addition, if subtask criteria 206 for a particular subtask 204 identify security specifications for the particular subtask, the AI module 110 can identify an available device in the system map 118 that is indicated as having security specifications that correspond, at least in part, to the security specification specified in the subtask criteria 206.

Accordingly, by correlating each of the subtasks 204 (and optionally, their respective subtask criteria 206) to devices identified in the system map 118, the AI module 110 assigns individual subtasks 204 to individual client devices 106. In at least one implementation, subtask assignment involves layer assignment 210 that assigns execution of different model layers 116 of the AI model 114 to different client devices 106 for purposes of performing respective subtasks 204. For instance, an individual subtask 204 corresponds to execution of an instance and/or set of the model layers 116.

Further to the scenario 200, the subtask assignment 208 includes assigning a subtask 204a (and optionally model layer(s) 116a) to the client device 106a, assigning a subtask 204b (and optionally model layer(s) 116b) to the client device 106b, and assigning a subtask 204n (and optionally model layer(s) 116n) to the client device 106n. Generally, the subtask assignment 208 can be performed in various ways. For instance, the AI module 110 executing on a particular device can perform the subtask assignment to each of the client devices 106a-106n, such as in parallel or serially. In an alternative or additional implementation, the subtask assignment 208 can be performed in series among the client devices 106. For instance, the AI module 110 can assign the subtask 204a to the client device 106a, and the client device 106a can then assign the subtask 204b to the client device 106b, which in turn can assign the subtask 204n to the client device 106n, and so forth.

Generally, the AI module 110 that identifies (e.g., generates) the subtasks 204 and performs the subtask assignment 208 can be implemented in various ways. For instance, an AI module 110 executing on an instance of a client device 106 can manage subtask identification and assignment among the different client devices 106. Alternatively or in addition, subtask identification and assignment can be performed cooperatively among the group of client devices 106 participating in executing the different subtasks 204. In yet another alternative or additional implementation, the AI module 110 executing on the server device 124 can perform subtask identification and assignment to the different client devices 106. In yet another alternative or additional implementation, the AI service 126 can perform subtask identification and assignment to the different client devices 106, such as via communication between the AI service 126 and the local network 108.

Accordingly, the AI module 110 on each of the client devices 106 can utilize its respective AI model 114 to execute its respective subtask 204. For instance, the client device 106a leverages its AI module 110 to execute the subtask 204a, such as by executing the model layer 116a of the AI model 114 to generate subtask output 212a. The subtask output 212a, for instance, represents output of the model layer 116a performing the subtask 204a.

In at least one implementation, the subtask 204a represents an initial processing step towards performing the computation task 202. For instance, the computation task 202 includes data to be processed for the computation task 202, such as a digital image for image recognition, digital audio for speech recognition, seed text for natural language generation, and so forth. Thus, the subtask 204a may represent an initial processing of the data, such as data encoding. The model layer 116a, for example, represents an encoding layer of the AI model 114 that encodes data provided as part of the computation task 202.

Alternatively or in addition, the subtask 204a can involve data capture at the client device 106a. For instance, the subtask 204a can instruct the client device 106a to capture data via one or more of its sensors 120, such as sensor data 122 that includes attributes of a surrounding environment. Examples of such sensor data 122 include an image from a camera, motion data from a motion sensor, location data from a location sensor, audio data from an audio sensor, etc. Thus, the sensor data 122 can be utilized for further processing, such as by the client device 106a and/or other device involved in performing the subtasks 204 as part of the computation task 202. In an example where the model layer 116a on the AI model 114 of the client device 106a represents an encoding layer, executing the subtask 204a can include encoding sensor data 122 captured at the client device 106a to generate the subtask output 212a.

Accordingly, the subtask output 212a represents data output by the AI module 110 of the client device 106a, such as data encoded by the model layer 116a. Thus, the client device 106b receives the subtask output 212a, and leverages its AI module 110 to perform the subtask 204b. The AI module 110 of the client device 106b, for instance, utilizes its AI model 114 to process the subtask output 212a utilizing the model layer 116b to generate subtask output 212b. As mentioned above, the subtask output 212a may represent data encoded by an encoding layer, e.g., the model layer 116a. Thus, the model layer 116b may represent intermediate layers (e.g., hidden layers) of the AI model 114 that perform further processing on the subtask output 212a to generate subtask output 212b.

The client device 106n then receives the subtask output 212b, and performs the subtask 204n using the subtask output 212b to generate subtask output 212n. The AI module 110 of the client device 106n, for instance, utilizes its AI model 114 to process the subtask output 212b utilizing the model layer 116n to generate subtask output 212n. In at least one implementation, the model layer 116n represents a decoding layer of the AI model 114, and thus the subtask output 212n represents decoded data, such as decoded from the subtask output 212b.

Further to the scenario 200, the AI module 110 utilizes the subtask output 212n to generate a task result 214, which represents a result of the computation task 202. The task result 214, for instance, can include visual and/or audible output that represents a result of the computation task 202. For example, in a scenario where the computation task 202 includes an input image and a request to perform object recognition on the input image, the task result 214 can include an object label for a visual object recognized in the input image as part of performance of the computation task. In a speech recognition scenario wherein the computation task 202 includes input audio, the task result 214 can include output text words and/or phrases recognized from the input audio.

Alternatively or additionally, the computation task 202 may be generative in nature, such as a request to generate images, text, audio, and so forth, based on patterns recognized by the AI model 114 from input content. Thus, the task result 214 can include content generated by the AI model 114 utilizing the different subtasks 204.

Figure 3:
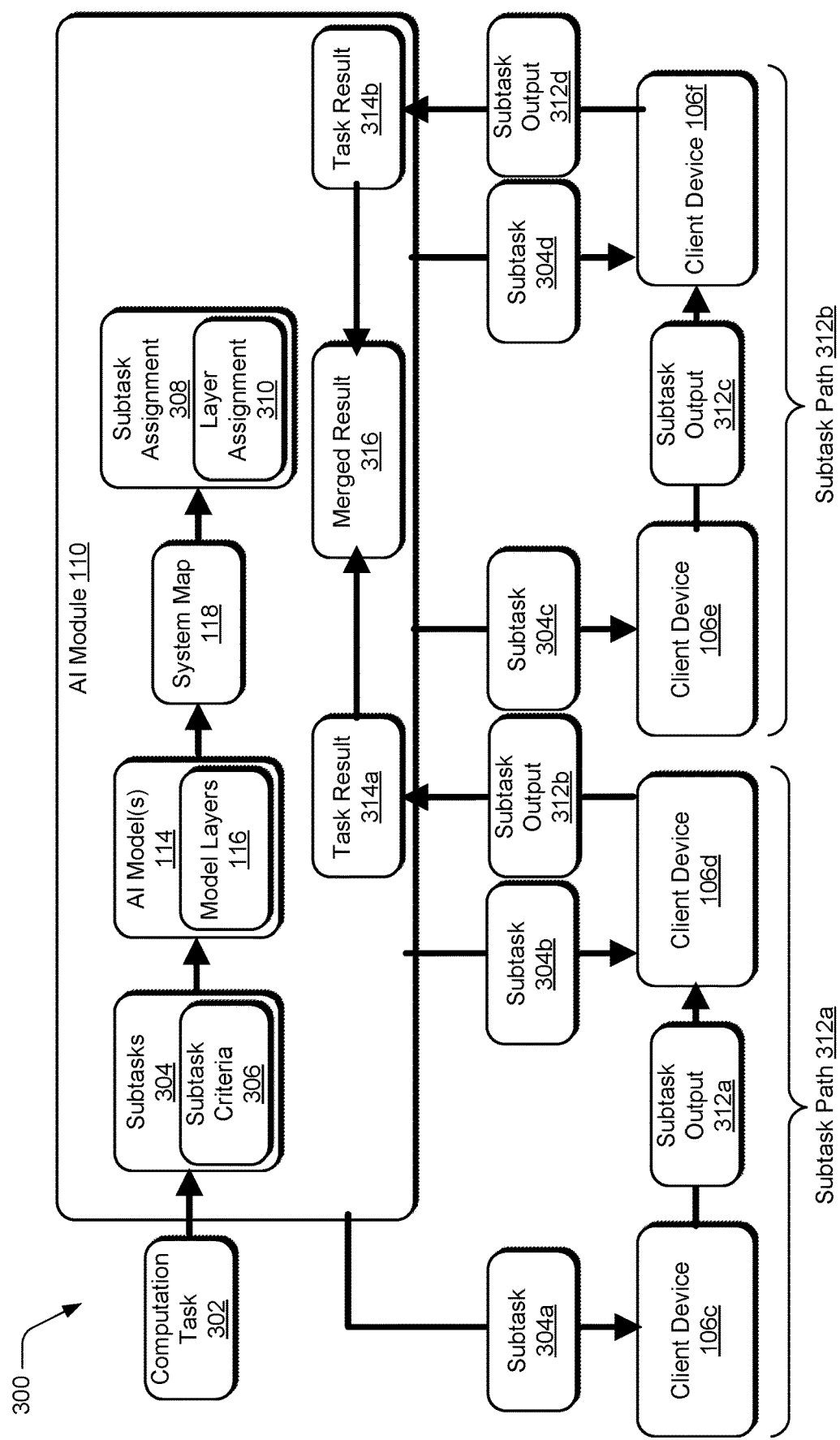
FIG. 3 depicts a scenario for using a multi-path implementation for performing a computing task according to techniques for subtask assignment for an AI task in accordance with one or more implementations.

FIG. 3 depicts an example scenario 300 using a multi-path implementation for performing a computing task according to techniques for subtask assignment for an AI task. The scenario 300, for instance, represents a variation on the scenario 200, and may be implemented alternatively or in addition to the scenario 200. Certain details discussed in the scenario 200 are not expressly mentioned in the discussion of the scenario 300, but are considered to be incorporated by reference.

In the scenario 300, an instance of the AI module 110 receives a computation task 302, and the AI module 110 generates subtasks 304, such as based on subtask criteria 306. Accordingly, the AI module 110 uses the system map 118 to perform subtask assignment 308 to different client devices 106, which may include layer assignment 310 for assigning execution of different model layers 116 of the AI model 114 to different client devices 106. Example details concerning generating subtasks for a computation task and subtask assignment are presented above.

In this particular example, the subtask assignment 308 includes assigning a subtask path 312a and a subtask path 312b, which represent different execution paths for executing the subtasks 304. The subtask path 312a, for instance, includes assigning a subtask 304a to a client device 106c and a subtask 304b to a client device 106d. Further, the subtask path 312b includes assigning a subtask 304c to a client device 106e and a subtask 304d to a client device 106f. Generally, the subtask paths 312a, 312b represent different independent execution paths that can be separately and independently executed to generate different results for the computation task 302. In at least one implementation, the subtasks 304a, 304b may be duplicates of the subtasks 304c,

304*d*. Alternatively, the subtasks 304*a*, 304*b* may be different than the subtasks 304*c*, 304*d*, such as based on differing device attributes between the subtask path 312*a* and the subtask path 312*b*. While the subtask paths 312*a*, 312*b* are depicted as being based on different sets of client devices 106, subtask paths may also include at least one common client device 106.

For instance, as part of execution of the subtask path 312*a*, the client device 106*c* executes the subtask 304*a* to generate subtask output 312*a*, which is provided to the client device 106*d*. The client device 106*d* then utilizes the subtask output 312*a* to execute the subtask 304*b* and generate subtask output 312*b*, which is utilized to generate a task result 314*a*. Although next expressly depicted herein, executing the subtasks 304*a*, 304*b* may include executing different respective model layers 116.

Further, as part of execution of the subtask path 312*b*, the client device 106*e* executes the subtask 304*c* to generate subtask output 312*c*, which is provided to the client device 106*f* The client device 106*f* then utilizes the subtask output 312*c* to execute the subtask 304*d* and generate subtask output 312*d*, which is utilized to generate a task result 314*b*. Although next expressly depicted herein, executing the subtasks 304*c*, 304*d* may include executing different respective model layers 116.

In at least one implementation, the subtask paths 312*a*, 312*b* can represent duplicate sets of subtasks 304 that are separately executable by the client devices 106 associated with the respective subtask paths 312*a*, 312*b*. Alternatively, the subtasks 304 associated with the respective subtask paths 312*a*, 312*b* represent different sets of subtasks 304. For instance, the subtasks 304*a*, 304*b* can be generated specifically for the client devices 106 of the subtask path 312*a*, and the subtasks 304*c*, 304*d* can be generated specifically for the client devices 106 of the subtask path 312*b*.

Generally, the subtask paths 312*a*, 312*b* can be generated based on different criteria. For instance, the AI module 110 can generate the subtask path 312*a* based on estimating that the client devices 106*c*, 106*d* of the subtask path 312*a* will likely generate the task result 314*a* for the computation task 302 quicker than the client devices 106 of the subtask path 312*b* will generate the task result 314*b*, such as based on current device functionality, processing bandwidth, hardware capability, and so forth. Further, the AI module 110 can generate the subtask path 312*b* based on estimating that the task result 314*b* generated by the client devices 106*e*, 106*f* will likely be more accurate than the task result 314*a*. Thus, in at least one implementation, the subtask path 312*a* is estimated to provide a quicker result, and the subtask path 312*b* is estimated to provide a more accurate result.

In at least one implementation, the task results 314*a*, 314*b* each represent different results for the computation task 302 that can each be separately output. For instance, in an implementation where the computation task 302 represents an image recognition task, the task results 314*a*, 314*b* can be separately output to provide separate labels for visual objects recognized from an input image. The task results 314*a*, 314*b*, for example, may indicate the same label for objects recognized in an input image, or may indicate different labels for the same respective object(s). Thus, the task results 314*a*, 314*b* may indicate duplicate results for the computation task 302, or may indicate at least some different results.

Alternatively or in addition to utilizing the task results 314*a*, 314*b* as separate task results, the task results 314*a*, 314*b* may be merged into a merged result 316. For instance, the AI module 110 may combine the task results 314*a*, 314*b* into a single merged result 316 that can be output separately from the individual task results 314*a*, 314*b*. Generally, the merged result 316 may include some results and omit other results from the task results 314*a*, 314*b*, and the included results combine to form the merged result 316.

Accordingly, the scenarios 200, 300 demonstrate that techniques for subtask assignment for an AI task can be implemented in a variety of different ways to delegate different AI tasks among devices available in a local environment.

Figure 4:
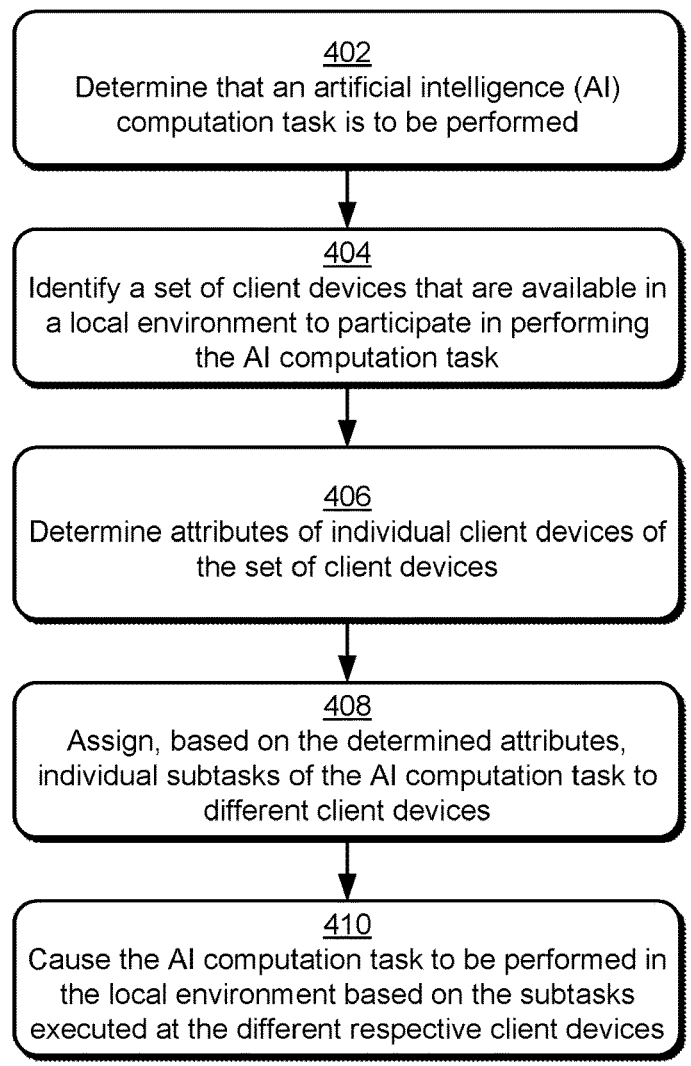
FIG. 4 depicts a method for performing aspects of subtask assignment for an AI task in accordance with one or more implementations described herein.

FIG. 4 depicts a method 400 for performing aspects of subtask assignment for an AI task. Generally, the method 400 may be performed in various ways, such as by an instance of a client device 106, via cooperative communication among the client devices 106, and/or by the server device 124. At 402, it is determined that an artificial intelligence (AI) computation task is to be performed. A user for instance, provides input requested that a particular task be performed, and the AI module 110 receives the input and determines to utilize an AI technique to perform the task. Examples of different AI tasks are discussed above, and include tasks such as visual object recognition, speech recognition, content generation, and so forth.

At 404, a set of client devices is identified that is available in a local environment to participate in performing the AI computation task. The AI module 110, for instance, inspects the system map 118 to identify client devices that are available to perform subtasks as part of the AI computation task. Additionally or alternatively, the AI module 110 can identify available client devices based on device attributes such as device proximity, device presence, device availability, device (e.g., hardware) capability, device battery level, and so forth. The system map 118, for example, identifies client devices 106 that are active and/or that are activatable in the local environment 102. In at least some implementations, certain client devices 106 can be identified in the system map 118 as eligible for participating in performing AI tasks, whereas other client devices 106 may be identified as ineligible for participating in performing AI tasks. Thus, devices identified as ineligible may be ignored for purposes of assigning AI subtasks. For instance, to be eligible to participate in an AI task, a client device may need to be specifically authenticated within the local environment 102, such as with the local network 108. Thus, a client device that is not authenticated (e.g., as indicated in the system map 118) may be ineligible to receive assignment of a subtask of an AI computation task.

At 406 attributes of individual client devices of the set of client devices are determined. The AI module 110, for instance, inspects the system map 118 to determine attributes of client devices that are available to participate in executing the AI computation task. As detailed previously, the system map 118 may list various attributes of individual client devices, such as performance attributes, hardware attributes, software attributes, and so forth.

As an addition or alternative to utilizing the system map 118, the AI module 110 can communicate with various client devices 106 in the local environment 102 to determine whether the devices are available for participating in an AI computation task, and/or to determine device attributes. For instance, a device executing the AI module 110 (e.g., a client device 106 and/or the server device 124) can perform a scan for available devices, such as a wireless scan to detect signal transmission from nearby client devices. When a client device is detected, the AI module 110 can query for device availability and/or device attributes. For instance, the AI module 110 can verify that a detected device is paired and/or authenticated to a user. Alternatively or in addition, client devices 106 can transmit availability beacons (e.g., wireless beacons) that indicate device availability and/or device attributes.

At 408, based on the determined attributes, individual subtasks of the AI computation task are assigned to different client devices of the set of client devices in the local environment. For example, the AI module 110 divides the computation task into different subtasks, and assigns the subtasks to different client devices 106. In at least one implementation, the AI module 110 divides the computation task into a set of subtasks based on available device resources. For instance, consider that the AI module 110 determines processing resources (e.g., processor bandwidth, memory bandwidth, processing speed, and so forth) for each of the available client devices, and by aggregating (e.g., summing) the processing resources for each client device, estimates total available processing resources for the set of client devices. The AI module 110 can then generate subtasks by estimating a total processing resource usage that will be utilized the perform the computation task, correlating the estimated processing usage to estimated available processing resources of the client devices 106, and assigning subtasks to individual client devices 106 based on their respective estimated processing usage. This way for generating and assigning subtasks is presented for purpose of example only, and it is to be appreciated that a variety of different techniques can be utilized to generate and assign subtasks for an AI computation task.

As discussed above, different subtasks can have different subtask criteria, such as estimated computing resource usage for respective subtasks. Thus, individual subtasks can be assigned to client devices that are estimated to correspond to subtask criteria for the individual subtasks. For instance, a particular subtask is assigned to a client device that is estimated to have computing resources (e.g., based on the system map 118) that are sufficient for performing the subtask according to the subtask criteria.

At 410, the AI computation task is caused to be performed in the local environment based on the subtasks executed at the different respective client devices. The AI module 110, for instance, communicates subtask parameters for assigned subtasks to respective client devices 106, which execute their respective subtasks. In at least one implementation, the AI module 110 communicates data to be processed along with one or more of the assigned subtasks, such as input content that is to be characterized and/or transformed using the AI computation task. Task results based on execution of the different subtasks can then be output, such as via visual output and/or audio output.

Generally, the subtasks can be distributed and executed among devices in various ways, such as via a serial execution path (e.g., as depicted in the scenario 200), and/or via multiple (e.g., parallel) execution paths, such as depicted in the scenario 300. In an implementation with multiple separate execution paths, each execution path can output its own task result, and/or the task results from the separate execution paths can be merged into a single combined execution path.

As discussed above, assigned subtasks can include instructions to execute particular layers of the AI model 114 at particular instances of client devices 106. Further, subtask output can be shared among client devices, such as part of a defined execution path. For instance, a subtask assigned to a particular device can utilized subtask output from a different device.

Figure 5:
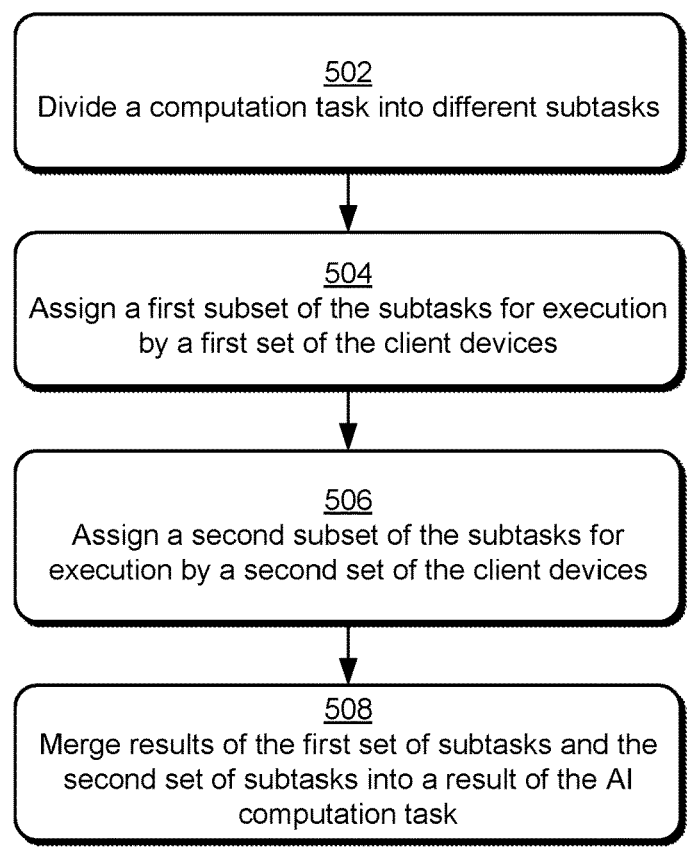
FIG. 5 depicts a method for utilizing multiple execution paths as part of performing aspects of subtask assignment for an AI task in accordance with one or more implementations described herein.

FIG. 5 depicts a method 500 for utilizing multiple execution paths as part of performing aspects of subtask assignment for an AI task. Generally, the method 500 may be performed in various ways, such as by an instance of a client device 106, via cooperative communication among the client devices 106, and/or by the server device 124. In at least one implementation, the method 500 can be performed in conjunction with the method 400 to cause a computation task to be executed using different execution paths.

At 502, a computation task is divided into different subtasks. The AI module 110, for instance, determines that a particular computation task is to be performed, and divides the computation task into different subtasks. Example ways and attributes of generating subtasks for a computation task are detailed above.

At 504, a first subset of the subtasks is assigned for execution by a first set of client devices. The AI module 110, for instance, assigns the first set of subtasks based on subtask criteria for the subtasks, and/or device attributes of the first set of client devices. Example ways for assigning subtasks are detailed above.

At 506, a second subset of the subtasks is assigned for execution by a second set of the client devices. The AI module 110, for instance, assigns the second set of subtasks based on subtask criteria for the subtasks, and/or device attributes of the second set of client devices. Example ways for assigning subtasks are detailed above.

As discussed with reference to the scenario 300, the different sets of subtasks and client devices can be utilized to define different execution paths. For instance, the AI module 110 may determine that the first set of client devices 106 is estimated to generate a task result quicker than the second set of client devices. Additionally or alternatively, the AI module may determine that the second set of client devices 106 is estimated to provide a more accurate task result than the first set of client devices.

Generally, this difference in execution time and/or accuracy of the different execution paths may be based on attributes of the different client devices (e.g., differences in device resources), and/or differences in parameters of the subtasks. For instance, the first subset of subtasks may be simpler and thus require less processing resources, but also may provide a coarser, less accurate result. Further, the second set of subtasks may be more computationally complex and thus require more computing resources but provide a more complex and/or accurate task result.

At 508, results of the first set of subtasks and the second set of subtasks are merged into a merged result of the AI computation task. In at least one implementation, step 508 is optional, and respective results of the first set of subtasks and the second set of subtasks can be separately output, additionally or alternatively to being merged.

In implementations where task results are combined into a merged tasks, different algorithms may be utilized to merge the task results. For instance, when the different subtasks are executed, a confidence value for each subtask can be generated that indicates how confident the respective AI module is that the subtask result is accurate. Thus, the AI module 110 can merge task results with the highest confidence values into a merged task result.

Figure 6:
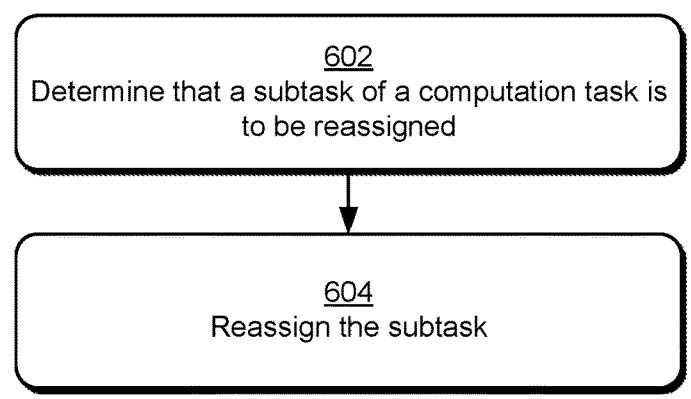
FIG. 6 depicts a method for reassigning a subtask of a computation task as part of performing aspects of subtask assignment for an AI task in accordance with one or more implementations described herein.

FIG. 6 depicts a method 600 for reassigning a subtask of a computation task as part of performing aspects of subtask assignment for an AI task. Generally, the method 600 may be performed in various ways, such as by an instance of a client device 106, via cooperative communication among the client devices 106, and/or by the server device 124. In at least one implementation, the method 600 can be performed in conjunction with the methods 400, 500 to cause a subtask of a computation task to be reassigned.

At 602, it is determined that a subtask of a computation task is to be reassigned. The AI module 110, for instance, determines that a subtask that was previously assigned to a particular client device 106 (e.g., as described above) is to be reassigned to a different client device. Generally, different events can cause an indication that a subtask is to be reassigned. For instance, the AI module 110 can receive an indication that a particular client device 106 to which a subtask was previously assigned is no longer available and/or eligible to execute the assigned subtask. The particular client device 106, for example, has become inactive (e.g., powered down), has left the local environment 102, has become unauthenticated, is experiencing a technical problem (e.g., a reduction in available computing resource, a power loss (e.g., low battery level)), and so forth.

Alternatively or in addition, an indication that a subtask is to be reassigned can be based on a change in the local environment 102, such as a new client device 106 connecting to the local network 108. The AI module 110, for instance, may determine that a new client device 106 detected in the local environment 102 is more suitable for performing a previously assigned subtask, and may determine that the subtask is to be reassigned to the new client device. Generally, different changes detected in the local environment 102 to cause subtask reassignment can be based on changes detected in the system map 118.

At 604, the subtask is reassigned. The AI module 110, for example, reassigns the subtask to a different client device 106. In at least one implementation, subtask reassignment is performed similarly to subtask assignment, details of which are discussed above. For instance, subtask criteria for the subtask are utilized to identify a client device 106 that is suitable to receive reassignment of the subtask and to execute the subtask, such as based on attributes of the client device 106 specified in the system map 118. Thus, the reassigned subtask can be executed by the client device 106 as part of a computation task. Example ways for executing subtasks as part of a computation task are detailed above.

Accordingly, implementations of subtask assignment for an AI task include various ways for dividing a computation task into different subtasks and assigning the subtasks for execution by different devices.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 7:
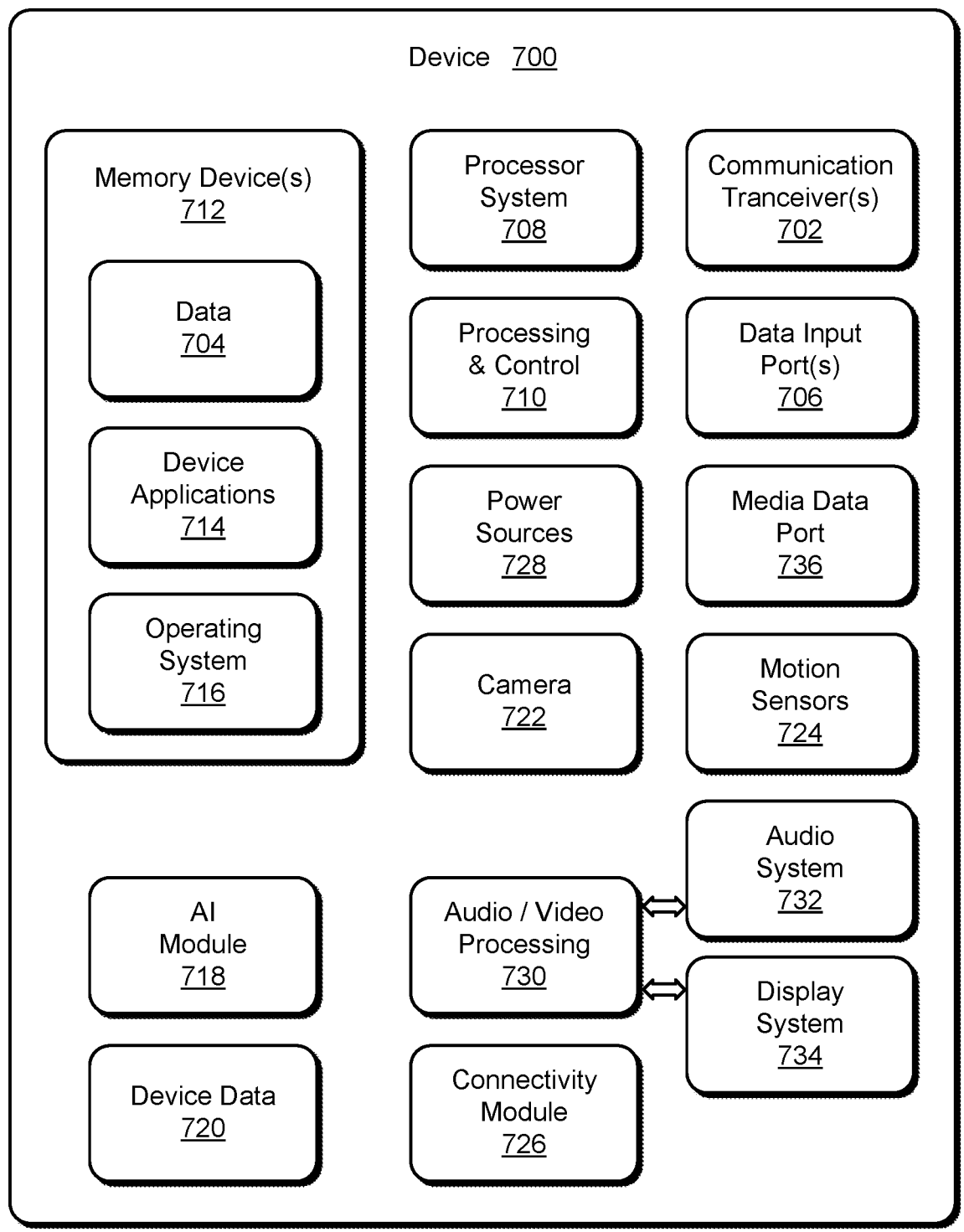
FIG. 7 illustrates various components of an example device that can implement aspects of subtask assignment for an AI task.

FIG. 7 illustrates various components of an example device 700 in which aspects of subtask assignment for an AI task can be implemented. The example device 700 can be implemented as any of the devices described with reference to the previous FIGS. 1-6, such as any type of mobile device, mobile phone, mobile device, wearable device, tablet, computing, communication, entertainment, gaming, media playback, and/or other type of electronic device. For example, the client devices 106 as shown and described with reference to FIGS. 1-6 may be implemented as the example device 700.

The device 700 includes communication transceivers 702 that enable wired and/or wireless communication of data 704 with other devices. The data 704 can include any of device identifying data, device location data, wireless connectivity data, and wireless protocol data. Additionally, the data 704 can include any type of audio, video, and/or image data, sensor data, etc. Example communication transceivers 702 include wireless personal area network (WPAN) radios compliant with various IEEE 702.15 (Bluetooth™) standards, wireless local area network (WLAN) radios compliant with any of the various IEEE 702.11 (Wi-Fi™) standards, wireless wide area network (WWAN) radios for cellular phone communication, wireless metropolitan area network (WMAN) radios compliant with various IEEE 702.16 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 (e.g., memory devices) that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory 712 provides data storage mechanisms to store the data 704, other types of information and/or data, and various device applications 714 (e.g., software applications). For example, an operating system 716 can be maintained as software instructions with a memory device and executed by the processing system 708. The device applications may also include a device manager, such as any form of a control application, software application, signal-processing and control module, code that is native to a particular device, a hardware abstraction layer for a particular device, and so on. Computer-readable storage memory 712 represents media and/or devices that enable persistent and/or non-transitory storage of information in contrast to mere signal transmission, carrier waves, or signals per se. Computer-readable storage memory 712 do not include signals per se or transitory signals.

In this example, the device 700 includes an AI module 718 that implements aspects of subtask assignment for an AI task, and may be implemented with hardware components and/or in software as one of the device applications 714, such as when the device 700 is implemented as the client device 106. An example, the AI module 718 can be implemented as the AI module 110 described in detail above. In implementations, the AI module 718 may include independent processing, memory, and logic components as a computing and/or electronic device integrated with the device 700. The device 700 also includes device data 720 for implementing aspects of subtask assignment for an AI task, and may include data from the AI module 718.

In this example, the example device 700 also includes a camera 722 and motion sensors 724, such as may be implemented in an inertial measurement unit (IMU). The motion sensors 724 can be implemented with various sensors, such as a gyroscope, an accelerometer, and/or other types of motion sensors to sense motion of the device, e.g., GPS. The various motion sensors 724 may also be implemented as components of an inertial measurement unit in the device.

The device 700 also includes a connectivity module 726, which is representative of functionality to perform various data communication tasks. The connectivity module 726 represents functionality (e.g., hardware and logic) that enables the client device 106 to communicate data between difference devices, such as client devices in the local environment 102. Generally, the connectivity module 726 supports communication via a variety of different wired and wireless protocols, such as for data and voice communication. The connectivity module 726, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, Neighborhood Awareness Networking (NAN), wireless short distance communication (e.g., Bluetooth™ (including Bluetooth™ Low Energy (BLE)), Near Field Communication (NFC)), and so forth.

For instance, for the client device 106, the connectivity module 726 can be leveraged to scan for and detect wireless networks, as well as negotiate wireless connectivity to wireless networks for the client device 106. The device 700 can also include one or more power sources 728, such as when the device is implemented as a mobile device. The power sources 728 may include a charging and/or power system, and can be implemented as a flexible strip battery, a rechargeable battery, a charged super-capacitor, and/or any other type of active or passive power source. Generally, utilizing implementations of subtask assignment for an AI task enables the power sources 728 to be conserved as part of a wireless network connectivity process.

The device 700 also includes an audio and/or video processing system 730 that generates audio data for an audio system 732 and/or generates display data for a display system 734. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 736. In implementations, the audio system and/or the display system are integrated components of the example device. Alternatively, the audio system and/or the display system are external, peripheral components to the example device.

Although implementations of subtask assignment for an AI task have been described in language specific to features and/or methods, the subject of the appended claims is not necessarily limited to the specific features or methods described. Rather, the features and methods are disclosed as example implementations of subtask assignment for an AI task, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, including: determining that an artificial intelligence (AI) computation task is to be performed; identifying a set of client devices that are available in a local environment to participate in performing the AI computation task; determining attributes of individual client devices of the set of client devices; assigning, based on the determined attributes, individual subtasks of the AI computation task to different client devices of the set of client devices in the local environment; and causing the AI computation task to be performed in the local environment based on the subtasks executed at the different respective client devices.

Alternatively or in addition to the above described method, any one or combination of: wherein said identifying the set of client devices comprises inspecting a system map that identifies client devices that are available in the local environment for participating in the AI computation task; wherein said determining attributes of individual client devices comprises determining, for each of the individual client devices, one or more of computing resource capabilities, hardware resources, or security attributes; wherein at least one of the subtasks includes a subtask criteria for performing the at least one subtask, and wherein the method further comprises assigning the at least one subtask to a particular client device based on determining that attributes of the particular client device correspond to the subtask criteria; wherein the subtask criteria specifies one or more of a computing resource criterion, a hardware criterion, or a security criterion for the at least one subtask; wherein at least one of the individual subtasks represents one or more layers of an AI model; wherein said assigning comprises assigning execution of the one or more layers of the AI model to a particular client device; wherein the subtasks each represent different layers of an AI model, and wherein said assigning comprises assigning a different layer of the AI model to each of the different client devices; wherein said assigning individual subtasks of the AI computation task to different client devices comprises: assigning a first subset of the subtasks for execution by a first set of the client devices; assigning a second subset of the subtasks for execution by a second set of the client devices; and merging results of the first set of subtasks and the second set of subtasks into a merged result of the AI computation task.

A system including: one or more processors; and one or more computer-readable storage memory storing instructions that are executable by the one or more processors to: determine that an artificial intelligence (AI) computation task is to be performed; identify a set of client devices that are available in a local environment to participate in performing the AI computation task; assign individual subtasks of the AI computation task to different client devices of the set of client devices in the local environment; and cause the AI computation task to be performed in the local environment based on the subtasks executed at the different respective client devices.

Alternatively or in addition to the above described system, any one or combination of: wherein to identify the set of client devices that are available in the local environment to participate in performing the AI computation task includes to inspect a system map that identifies devices in the local environment that include attributes indicating that the devices are capable of executing one or more of the individual subtasks; wherein to assign individual subtasks of the AI computation task to different client devices includes to: determine device capabilities of the set of client devices; determine subtask criteria for the individual subtasks; and assign the individual subtasks to respective client devices based on client devices that exhibit capabilities that correspond to the subtask criteria; wherein to assign individual subtasks of the AI computation task to different client devices includes to: assign the individual subtasks to a first set of the client devices and to a second set of the client devices based on determining that the first set of the client devices is likely to execute the subtasks faster than the second set of client devices, and that the second set of client devices is likely to execute the subtasks more accurately than the first set of client devices; wherein to assign individual subtasks of the AI computation task to different client devices includes to: determine first subtask output from the first set of client devices and second subtask output from the second set of client devices; and merge the first subtask output and the second subtask output into a task result for the AI computation task; wherein to determine that the artificial intelligence (AI) computation task is to be performed includes to determine that the AI computation task is to be performed using an AI model with multiple layers, and wherein to assign individual subtasks of the AI computation task to different client devices of the set of client devices includes to assign execution of different respective layers of the AI model to different respective client devices; wherein the instructions are executable by the one or more processors to determine that a particular subtask includes capturing sensor data via one or more sensor, and wherein to assign the individual subtasks of the AI computation task to different client devices includes to assign the particular subtask to a client device identified as having a capability of capturing the sensor data.

A method, including: determining that an artificial intelligence (AI) computation task is to be performed via an AI model with multiple layers; identifying a set of client devices that are available in a local environment to participate in performing the AI computation task; assigning different individual layers of the AI model to different client devices of the set of client devices in the local environment; and causing the AI computation task to be performed in the local environment based on the different layers of the AI model executed at the different respective client devices. Alternatively or in addition to the above described method, any one or combination of: wherein the AI model comprises an artificial neural network, and wherein the multiple layers comprise an encoding layer, one or more intermediate layers, and a decoding layer; wherein said assigning different individual layers of the AI model to different client devices comprises assigning the encoding layer to a first client device, one or more of the intermediate layers to a second client device, and the decoding layer to a third client device; wherein a particular layer of the AI model includes an input of sensor data, and wherein said assigning different individual layers of the AI model to different client devices comprises assigning the particular layer to a client device that is identified as being capable of capturing the sensor data.

The invention claimed is:

1. A method, including:
  receiving an artificial intelligence (AI) computation task to be performed;
  identifying a set of client devices that are available in a local environment to participate in performing the AI computation task;
  identifying attributes of individual client devices of the set of client devices, including identifying security specifications for the set of client devices;
  dividing the AI computation task into individual subtasks;
  identifying hardware specifications for the individual subtasks;
  assigning, based on the attributes, the individual subtasks of the AI computation task to different client devices of the set of client devices in the local environment, including:
    identifying, from multiple different defined security levels, a security level for a first subtask of the individual subtasks;
    identifying a computation resource for performing the first subtask of the individual subtasks; and
    assigning the first subtask to a first client device of the set of client devices based at least in part on identifying that the first client device has a security specification corresponding to the security level for the first subtask, the computation resource for performing the first subtask, and a hardware specification for the first subtask; and
  performing the AI computation task by executing the individual subtasks of the AI computation task at the different client devices.

2. The method of claim 1, wherein said identifying the set of client devices comprises inspecting a system map that identifies client devices that are available in the local environment for participating in the AI computation task.

3. The method of claim 1, wherein said identifying attributes of the individual client devices comprises identifying, for each of the individual client devices, hardware resources or security attributes.

4. The method of claim 1, wherein at least one of the individual subtasks includes a subtask criteria for executing the individual subtasks of the AI computation task, and wherein the method further comprises assigning the at least one subtask to a particular client device based on identifying that attributes of the particular client device correspond to the subtask criteria.

5. The method of claim 4, wherein the subtask criteria specifies one or more of a computing resource criterion for the at least one subtask.

6. The method of claim 1, wherein at least one of the individual subtasks represents one or more layers of an AI model.

7. The method of claim 6, wherein said assigning comprises assigning execution of the one or more layers of the AI model to a particular client device.

8. The method of claim 1, wherein the individual subtasks each represent different layers of an AI model, and wherein said assigning comprises assigning a different layer of the AI model to each of the different client devices.

9. The method of claim 1, wherein the assigning the individual subtasks of the AI computation task to the different client devices of the set of client devices comprises:
assigning a first subset of the individual subtasks for execution by a first set of the individual client devices;
assigning a second subset of the individual subtasks for execution by a second set of the individual client devices; and
merging results of the first subset of the individual subtasks and the second subset of the individual subtasks into a merged result of the AI computation task.

10. The method of claim 1, further comprising:
identifying, based at least in part on a change in an attribute of the first client device, that the first subtask is to be reassigned; and
reassigning the first subtask to a different client device of the set of client devices to cause the first subtask to be executed by the different client device.

11. A system including:
one or more processors; and
one or more computer-readable storage memory storing instructions that are executable by the one or more processors to:
receive an artificial intelligence (AI) computation task to be performed;
identify a set of client devices that are available in a local environment to participate in performing the AI computation task;
divide the AI computation task into individual subtasks;
identify hardware specifications for the individual subtasks;
assign the individual subtasks to different client devices of the set of client devices in the local environment, including to:
identify, from multiple different defined security levels, a security level for a first subtask of the individual subtasks;
identify a computation resource for performing the first subtask of the individual subtasks;
identify security specifications for the different client devices; and
assign the first subtask to a first client device of the different client devices based at least in part on identifying that the first client device has a security specification for the first client device corresponding to the security level for the first subtask, the computation resource for performing the first subtask, and a hardware specification for the first subtask; and
perform the AI computation task by executing the individual subtasks of the AI computation task at the different client devices.

12. The system of claim 11, wherein to identify the set of client devices that are available in the local environment to participate in performing the AI computation task includes to inspect a system map that identifies devices in the local environment that include attributes indicating that the devices are capable of executing one or more of the individual subtasks.

13. The system of claim 11, wherein to assign individual subtasks of the AI computation task to the different client devices includes to:
determine device capabilities of the set of client devices;
determine subtask criteria for the individual subtasks; and
assign the individual subtasks to respective client devices based on client devices that exhibit capabilities that correspond to the subtask criteria.

14. The system of claim 13, wherein to assign the individual subtasks of the AI computation task to the different client devices includes to:
assign the individual subtasks to a second set of the client devices based on identifying that the second set of the client devices is likely to execute the individual subtasks faster than a first set of the client devices.

15. The system of claim 14, wherein to assign individual subtasks of the AI computation task to the different client devices includes to:
determine first subtask output from the first set of the client devices and second subtask output from the second set of the client devices; and
merge the first subtask output and the second subtask output into a task result for the AI computation task.

16. The system of claim 11, wherein to determine that the AI computation task is to be performed includes to determine that the AI computation task is to be performed using an AI model with multiple layers, and wherein to assign individual subtasks of the AI computation task to the different client devices of the set of client devices includes to assign execution of different respective layers of the AI model to different respective client devices.

17. The system of claim 11, wherein the instructions are executable by the one or more processors to determine that a particular subtask includes capturing sensor data via one or more sensor, and wherein to assign the individual subtasks of the AI computation task to different client devices includes to assign the particular subtask to a client device identified as having a capability of capturing the sensor data.

18. A method, including:
receive an artificial intelligence (AI) computation task to be performed via an AI model with multiple layers;
identifying a set of client devices that are available in a local environment to participate in performing the AI computation task;
dividing the AI model into different individual layers;
identifying hardware specifications for the different individual layers;
assigning the different individual layers of the AI model to different client devices of the set of client devices in the local environment, wherein a particular layer of the AI model includes an input of sensor data, and wherein said assigning the different individual layers of the AI model to the different client devices comprises:
- identifying sensor capabilities of at least some client devices of the set of client devices;
- identifying a computation resource for performing the particular layer of the different individual layers; and
- assigning the particular layer to a client device that is identified as being capable of capturing the sensor data and based on a hardware specification for the particular layer and the computation resource for performing the particular layer of the different individual layers; and performing the AI computation task by executing the different individual layers of the AI computation task at the different client devices.

19. The method of claim 18, wherein the AI model comprises an artificial neural network, and wherein the multiple layers comprise an encoding layer, one or more intermediate layers, and a decoding layer.

20. The method of claim 19, wherein said assigning the different individual layers of the AI model to the different client devices comprises assigning the encoding layer to a first client device, the one or more intermediate layers to a second client device, and the decoding layer to a third client device.

* * * * *